(12) United States Patent
Kim

(10) Patent No.: US 9,306,202 B2
(45) Date of Patent: Apr. 5, 2016

(54) SEPARATOR FOR A SECONDARY BATTERY AND SECONDARY BATTERY INCLUDING THE SAME

(71) Applicant: SAMSUNG SDI CO., LTD., Yongin-si, Gyeonggi-do (KR)

(72) Inventor: Chan-Seok Kim, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 136 days.

(21) Appl. No.: 13/800,335

(22) Filed: Mar. 13, 2013

(65) Prior Publication Data

US 2014/0141312 A1  May 22, 2014

Related U.S. Application Data

(60) Provisional application No. 61/728,524, filed on Nov. 20, 2012.

(51) Int. Cl.
- *H01M 2/16* (2006.01)
- *H01M 2/14* (2006.01)
- *H01M 10/052* (2010.01)

(52) U.S. Cl.
CPC ............ *H01M 2/1686* (2013.01); *H01M 2/145* (2013.01); *H01M 2/162* (2013.01); *H01M 2/1646* (2013.01); *H01M 2/1626* (2013.01); *H01M 2/1666* (2013.01); *H01M 10/052* (2013.01)

(58) Field of Classification Search
None
See application file for complete search history.

(56) References Cited

U.S. PATENT DOCUMENTS

| | | | | |
|---|---|---|---|---|
| 4,460,371 A | * | 7/1984 | Abber | 424/448 |
| 6,030,422 A | * | 2/2000 | Pyszczek | 29/623.1 |
| 6,465,125 B1 | | 10/2002 | Takami et al. | |
| 2001/0000485 A1 | | 4/2001 | Ying et al. | |
| 2011/0200863 A1 | * | 8/2011 | Xiao et al. | 429/144 |

FOREIGN PATENT DOCUMENTS

| | | |
|---|---|---|
| DE | 101-42-622 A1 | 3/2003 |
| EP | 0-913-875 A2 | 5/1999 |
| JP | 2000-149997 A | 5/2000 |
| JP | 2010-194726 A | 9/2010 |
| JP | 2011-082148 A | 4/2011 |

OTHER PUBLICATIONS http://www.pslc.ws/macrog/ptfe.htm. Department of Polymer Science: University of Southrn Mississippi. 2005.*
Search Report mailed Mar. 18, 2014 in corresponding European Patent Application No. 13164253.0.

* cited by examiner

*Primary Examiner* — Patrick Ryan
*Assistant Examiner* — Christopher Domone
(74) *Attorney, Agent, or Firm* — Lee & Morse, P.C.

(57) ABSTRACT

A separator for a secondary battery and a secondary battery including the same, the separator including a porous substrate; a patterned fabric layer on at least one side of the porous, the patterned fabric layer having patterns; and a polymer coating layer on the patterned fabric layer.

19 Claims, 8 Drawing Sheets

SEPARATOR FOR A SECONDARY BATTERY AND SECONDARY BATTERY INCLUDING THE SAME

The present application claims priority under 35 U.S.C. §119 to U.S. Provisional Application No. 61/728,524, filed on Nov. 20, 2012, and entitled: "Separator for Rechargeable Lithium Battery Method of Preparing the Same and Rechargeable Lithium Battery Including the Same," which is incorporated herein by reference in its entirety.

BACKGROUND

1. Field

Embodiments relate to a separator for a secondary battery and a secondary battery including the same.

2. Description of the Related Art

A secondary or rechargeable lithium battery may include a separator made of a porous insulating film and interposed between positive and negative electrodes. The pores of the film may be impregnated by an electrolyte solution including a lithium salt dissolved therein. The secondary battery may have excellent high-capacity and high energy density characteristics.

SUMMARY

Embodiments are directed to a separator for a secondary battery and a secondary battery including the same.

The embodiments may be realized by providing a separator for a secondary battery, the separator including a porous substrate; a patterned fabric layer on at least one side of the porous, the patterned fabric layer having patterns; and a polymer coating layer on the patterned fabric layer.

The patterned fabric layer may be a woven, non-woven, or knitted fabric.

The patterns of the patterned fabric layer may have a reticular structure or an island structure.

The patterned fabric layer may cover about 1% to about 50% of a surface of the porous substrate.

The patterned fabric layer may include at least one of a polymer, glass, or cellulose fiber.

The patterned fabric layer may have a thickness of about 10 μm to about 10,000 μm.

The polymer coating layer may include at least one of an acrylate polymer, a urethane polymer, a melamine polymer, an epoxy polymer, an unsaturated ester polymer, a resorcinol polymer, a polyamide, a vinyl polymer, and a styrene polymer.

The polymer coating layer may further include a binder.

The polymer coating layer may include an adhesive.

The separator may further include a ceramic layer on the patterned fabric layer.

The ceramic layer may be porous.

The ceramic layer may include at least one metal compound selected from the group of a metal oxide, a metal nitride, and a metal phosphide.

The ceramic layer may be in the patterns of the patterned fabric layer, and the polymer coating layer may be on the ceramic layer.

The ceramic layer and the patterned fabric layer may each have a thickness, the thickness of the ceramic layer being the same as the thickness of the patterned fabric layer.

The ceramic layer and the patterned fabric layer may each have a thickness, the thickness of the ceramic layer being greater than the thickness of the patterned fabric layer.

The ceramic layer and the patterned fabric layer may each have a thickness, the thickness of the ceramic layer being less than the thickness of the patterned fabric layer.

The porous substrate may include a polyolefin, the polyolefin including at least one of polyethylene, polypropylene, polyvinylidene fluoride, or a copolymer thereof.

The polymer coating layer may be on an outermost surface of the patterned fabric layer such that the patterned fabric layer is between the polymer coating layer and the porous substrate.

The polymer coating layer may be on an outermost surface of the patterned fabric layer and in the patterns of the patterned fabric layer.

The embodiments may also be realized by providing a secondary battery including an electrode assembly, the electrode assembly including a first electrode, a second electrode, and the separator according to an embodiment, the separator being between the first electrode and the second electrode.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
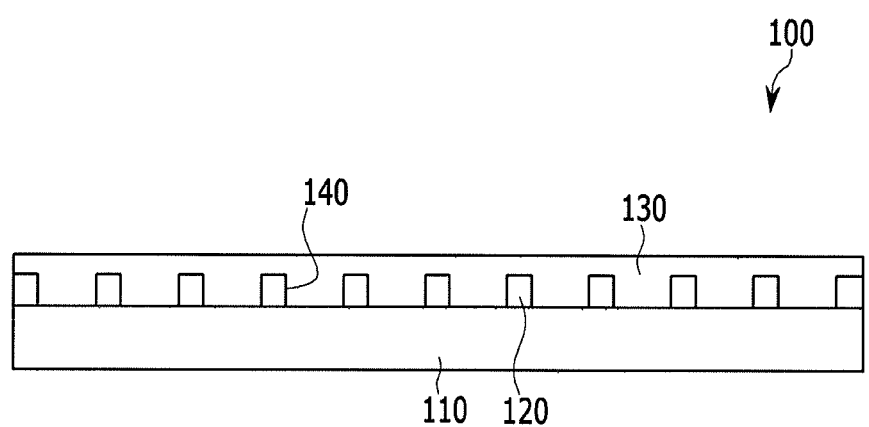
FIG. 1 illustrates a cross-sectional view of a separator for a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Hereinafter, referring to FIG. 1, a separator for a secondary or rechargeable lithium battery according to an embodiment is described. FIG. 1 illustrates a cross-sectional view of a separator for a secondary battery according to an embodiment.

Referring to FIG. 1, the separator for a secondary battery 100 according to an embodiment may include a porous substrate 110; a patterned fabric layer 120 on at least one side of the porous substrate 110; and a polymer coating layer 130 on at least one side, e.g., an outer side, of the patterned fabric layer 120.

The porous substrate 110 may include a plurality of pores through which an electrolyte solution may move back and forth between positive and negative electrodes. The porous substrate 110 may include a polyolefin resin. The polyolefin resin may include, e.g., polyethylene, polypropylene, polyvinylidene fluoride, a copolymer thereof, or a combination thereof.

The porous substrate 110 may be in the form of a single layer or a multilayer of more than two layers. The porous substrate 110 may include, e.g., a mixed multilayer such as a polyethylene/polypropylene double layered separator, a polyethylene/polypropylene/polyethylene triple layered separator, a polypropylene/polyethylene/polypropylene triple layered separator, and the like.

Figure 8:
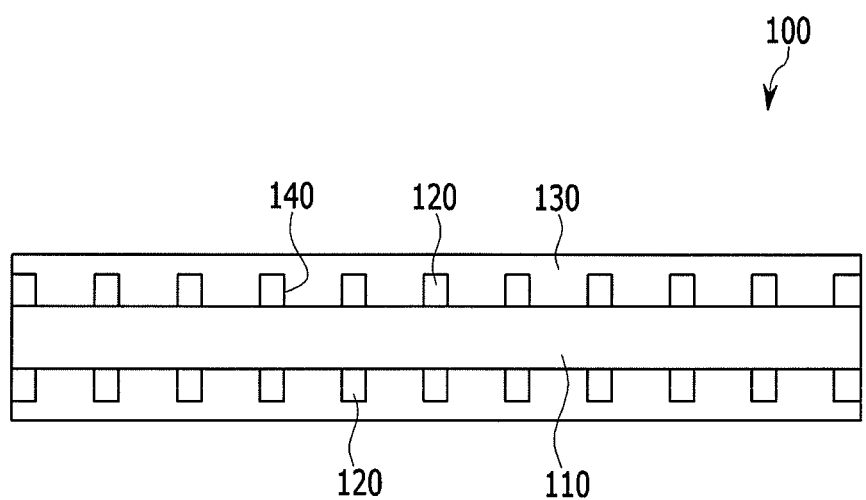
FIG. 8 illustrates a cross-sectional view of a separator for a secondary battery according to still another embodiment.

The patterned fabric layer 120 may be on one surface of the porous substrate 110. However, the embodiments are not limited thereto, and the patterned fabric layer 120 may be on both surfaces of the porous substrate 110 (see, e.g., FIG. 8). When the patterned fabric layer 120 is on both surfaces of the porous substrate 110, the both surfaces may have the same or different pattern. The patterned fabric layer 120 may be, e.g., a woven, non-woven, or knitted fabric.

The patterned fabric layer 120 may be formed by patterning a fabric layer with a predetermined repetitive pattern having, e.g., a reticular or island structure.

When the patterned fabric layer 120 has, e.g., a reticular structure, the pattern may be formed by crossing a plurality of first parts in one direction with a plurality of second parts in another direction. Herein, the first and second parts may form empty pores or patterns 140 where the first and second parts are not crossed each other.

When the patterned fabric layer 120 has, e.g., an island structure, a plurality of patterns separated from one another may be formed. The patterns may include, e.g., a web, a circle, a polygon, or a combination thereof. Herein, a plurality of the empty pores 140 may be formed where the patterns are not formed.

The patterned fabric layer 120 may help reduce the likelihood and/or prevent the porous substrate 110 from being shrunk by heat when the separator 100 is exposed to a high temperature. For example, the fabric layer 120 may serve as a fiber support layer.

As noted above, the patterned fabric layer 120 may include, e.g., a woven fabric. The woven fabric may be different from a non-woven fabric fabricated by thermally compressing a resin. The woven fabric may be made by weaving a plurality of threads with another plurality of thread perpendicularly crossing with them. Accordingly, the woven fabric may have excellent strength and durability and thus, may be usefully applied as a material for a fiber support layer. In addition, the woven fabric may have excellent formability and may well form a desired pattern.

The patterned fabric layer 120 may include, e.g., a polymer, glass, cellulose fibers, or a combination thereof. The polymer may include, e.g., polyester, polyimide, polyamide, or a combination thereof.

The patterned fabric layer 120 may be formed in an area of about 1% to about 50%, e.g., about 5% to about 30%, based on a total area of one surface of the porous substrate 110. As noted above, the empty pores 140 may be formed where the patterned fabric layer 120 is not formed on one surface of the porous substrate 110. Accordingly, when the patterned fabric layer 120 is formed within the area range based on the entire area of the porous substrate 110, appropriate porosity may be secured. The patterned fabric layer 120 may help efficiently prevent thermal shrinkage of the separator 100. Therefore, thermal safety of a battery may be improved.

The patterned fabric layer 120 may have a thickness of about 1 µm to about 10,000 µm, e.g., about 10 µm to about 5,000 µm. When the patterned woven fabric layer 120 has a thickness within the range, the separator 100 may have no thermal shrinkage and thus, may help improve thermal safety of a battery.

The polymer coating layer 130 may be formed on one surface of the patterned fabric layer 120. For example, the polymer coating layer 130 may be formed on an outer surface of the patterned fabric layer 120, i.e., a surface of the patterned fabric layer 120 distal to the porous substrate 110. The polymer coating layer 130 may cover a whole surface of the patterned fabric layer 120 and the porous substrate 110 and thus, may planarize one surface of the patterned fabric layer 120. Herein, the polymer coating layer 130 may planarize the surface of the separator 100 that faces an electrode plate as well as adhere the separator 100 to the electrode plate, e.g., the positive or negative electrode.

The polymer coating layer 130 may have a thickness of, e.g., about 1 µm to about 500 µm. When the polymer coating layer 130 has a thickness within the range, the separator 100 may maintain an appropriate adherence to the electrode plate and may help improve thermal safety of a battery.

The polymer coating layer 130 may include an adhesive. The polymer coating layer 130 may include, e.g., acrylate, urethane, melamine, epoxy, unsaturated ester, resorcinol, polyamide, vinyl, styrene, or a combination thereof. The polymer coating layer 130 may face the positive or negative electrode and may adhere the separator 100 to the positive or negative electrode.

The polymer coating layer 130 may further include a binder polymer. The binder polymer may include a polymer polymerized from at least one monomer selected from the group of ethylenic unsaturated carboxylic acid alkyl ester, a nitrile-based compound, a conjugated diene-based compound, ethylenic unsaturated carboxylic acid and a salt thereof, an aromatic vinyl compound, fluoroalkyl vinylether, vinylpyridine, a non-conjugated diene-based compound, α-olefin, an ethylenic unsaturated amide compound, and a sulfonic acid-based unsaturated compound.

The binder polymer may be included in an amount of about 10 wt % to about 70 wt %, based on a total amount of the polymer coating layer 130. When the binder is included within the range, the separator may maintain appropriate adherence to the positive or negative electrode and may help improve thermal safety of a battery.

Hereinafter, structures of separators for a secondary battery according to another embodiment are described referring to FIGS. 2 to 5. Repeated descriptions of like or similar elements may be omitted.

FIGS. 2 to 5 illustrate cross-sectional views showing structures of separators for a secondary battery according to other embodiments.

Figure 2:
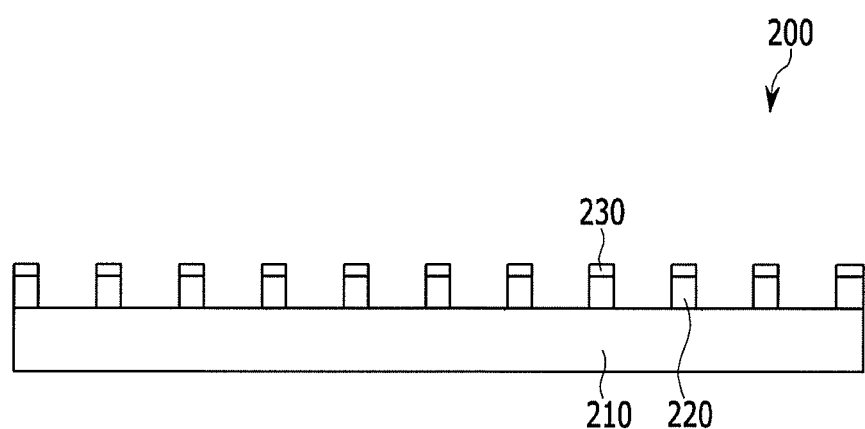
FIG. 2 illustrates a cross-sectional view of a separator for a secondary battery according to another embodiment.

Referring to FIG. 2, a separator for a secondary battery 200 according to the present embodiment may include a porous substrate 210, a patterned fabric layer 220, and a polymer coating layer 230 like the aforementioned embodiment.

However, the separator for a secondary battery 200 according to the present embodiment may include the polymer coating layer 230 positioned only on a top of the patterned fabric layer 220 but not covering the porous substrate 210 exposed in patterns of the patterned fabric layer 220, unlike the aforementioned embodiment. For example, the polymer coating layer 230 may be on an outermost surface of the patterned fabric layer 220 such that the patterned fabric layer 220 is between the polymer coating layer 230 and the porous substrate 210.

Herein, the separator 200 has higher porosity than the one according to the aforementioned embodiment and may be efficiently prevented from thermal shrinkage.

Figure 3:
FIG. 3 illustrates a cross-sectional view of a separator for a secondary battery according to yet another embodiment.

Referring to FIG. 3, the separator for a secondary battery 300 according to the present embodiment may include a porous substrate 310, a patterned fabric layer 320, and a polymer coating layer 330 like the aforementioned embodiment. The separator 300 according to the present embodiment may further include a ceramic layer 370.

The ceramic layer 370 may be positioned in the same layer with the patterned fabric layer 320, and may be formed on a part where the patterned fabric layer 320 is not applied on one side of the porous substrate 310. For example, the ceramic layer 370 may be coplanar with the patterned fabric layer 320 and may be in patterns of the patterned fabric layer 320.

The ceramic layer 370 may have substantially the same thickness as the patterned fabric layer 320. When the ceramic layer 370 has the same thickness, the separator 300 may be prepared by a simpler process.

The ceramic layer 370 may fill empty pores of the separator 300 and also, may help reinforce heat resistance of the separator 300 and apply thermal stability to a battery.

The ceramic layer 370 may be porous. The ceramic layer 370 may have a porosity of about 10 to about 50%, based on a total volume of the ceramic layer 370. When the ceramic layer 370 has a porosity within the range, ions may more smoothly move and battery performance may be improved.

The ceramic layer 370 may include a ceramic material, e.g., one selected from the group of metal oxide, metal nitride, metal phosphide, and a combination thereof. The metal of the metal oxide, metal nitride, or metal phosphide may include, e.g., one selected from the group of Al, Ti, Cr, Zr, Ca, Si, and a combination thereof.

The polymer coating layer 330 may be formed on one surface of the ceramic layer 370 and may planarize the ceramic layer 370 like the aforementioned embodiment. The polymer coating layer 330 may adhere an electrode plate to the separator 300 and may planarize the surface of the separator 300.

Figure 4:
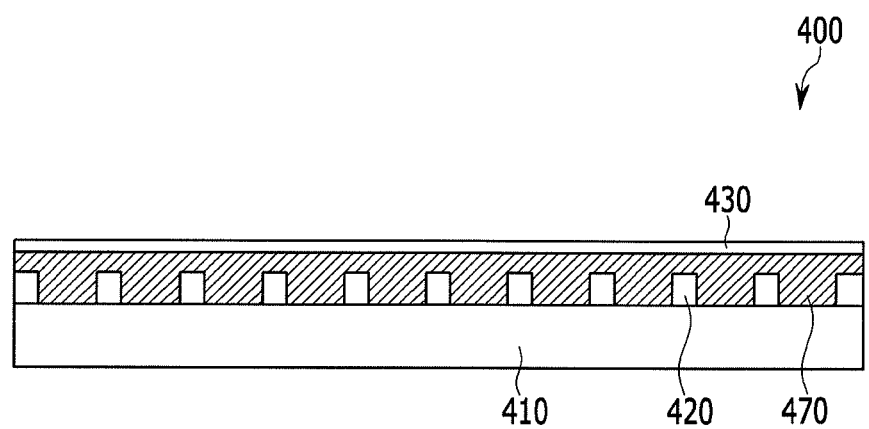
FIG. 4 illustrates a cross-sectional view of a separator for a secondary battery according to still another embodiment.

Referring to FIG. 4, a separator 400 for a secondary battery according to the present embodiment may include a porous substrate 410, a patterned fabric layer 420, a polymer coating layer 430, and a ceramic layer 470.

The ceramic layer 470 of the separator 400 according to the present embodiment may be substantially thicker than the patterned fabric layer 420. When the ceramic layer 470 has such a thickness, thermal stability of the separator may be improved. The polymer coating layer 430 may be on the ceramic layer 470.

Figure 5:
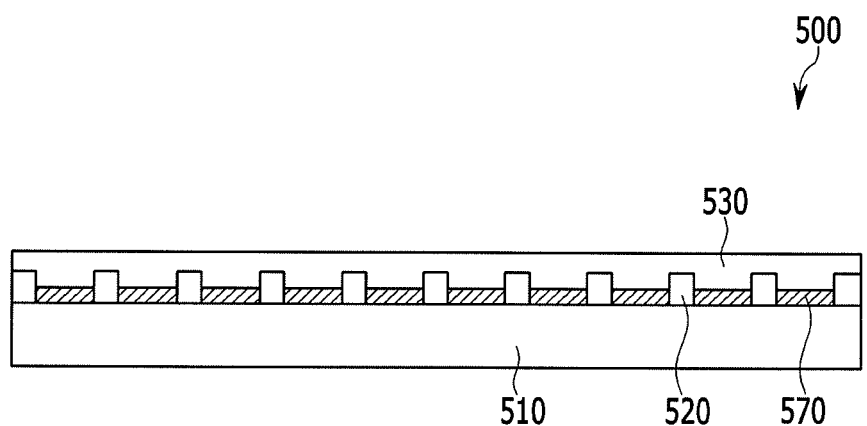
FIG. 5 illustrates a cross-sectional view of a separator for a secondary battery according to still another embodiment.

Referring to FIG. 5, a separator 500 for a secondary battery according to the present embodiment may include a porous substrate 510, a patterned fabric layer 520, a polymer coating layer 530, and a ceramic layer 570 like the aforementioned embodiment.

The ceramic layer 570 of the separator 500 may be substantially thinner than the patterned fabric layer 520. When the separator 500 has such a thickness, the separator 500 may have better adherence to the electrode plate. The polymer coating layer 530 may be on the ceramic layer 570 and the patterned fabric layer 520. For example, the polymer coating layer 530 may be on an outermost surface of the patterned fabric layer 520 and in the patterns of the patterned fabric layer 520, along with the ceramic layer 570.

Hereinafter, a method of preparing a separator for a secondary battery is described.

A method of preparing a separator according to an embodiment may include preparing a porous substrate; forming a patterned fabric layer on one side of the porous substrate; and forming a polymer coating layer on one side of the patterned fabric layer.

The method of preparing a separator according to another embodiment may further include forming a ceramic layer after forming the patterned fabric layer. Hereinafter, referring to FIG. 6, the method is described.

Figure 6:
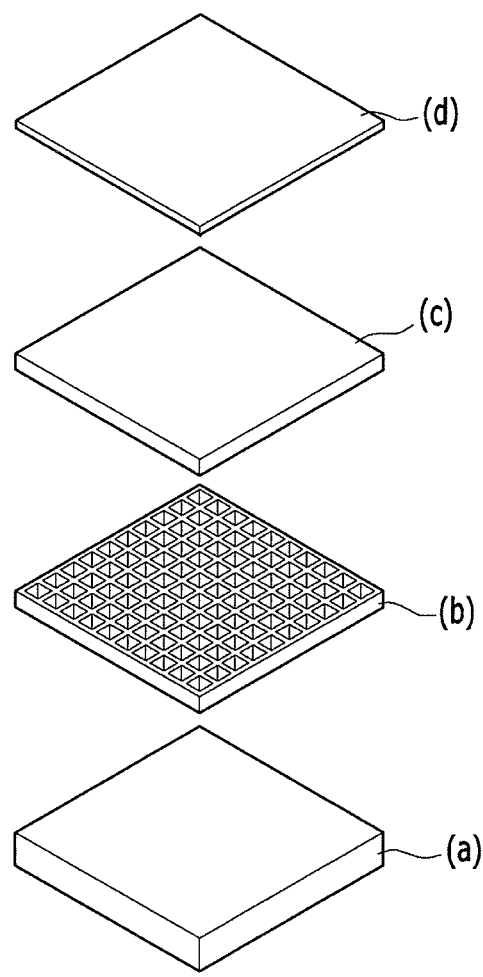
FIG. 6 illustrates an exploded perspective view showing a structure of a separator for a secondary battery according to an embodiment.

Referring to FIG. 6, a method of preparing a separator according to the present embodiment may include preparing a porous substrate (a); forming a patterned fabric layer on one side of the porous substrate (b); forming a ceramic layer on one side of the patterned fabric layer (c); and forming a polymer coating layer on one side of the patterned fabric layer (d).

First, the porous substrate may be prepared (a). The porous substrate may include a polyolefin resin as aforementioned.

Next, a patterned fabric layer may be formed on at least one surface of the porous substrate (b). The patterned fabric layer may be first patterned and then may be brought into contact with one side of the porous substrate. For example, the patterned fabric may be separately patterned from the porous substrate and then, disposed on one surface of the porous substrate.

In an implementation, the patterned fabric may be directly sprayed on one surface of the porous substrate. In an implementation, the pattern may be woven. The pattern may be formed by compressing a predetermined pattern.

The patterned fabric layer may have a reticular or island structure. The patterned fabric layer may be formed in an area of about 1% to about 50%, e.g., about 5% to about 30%, based on the entire area of one surface of the porous substrate. In an implementation, an empty pore may be formed where the patterned fabric layer is not formed on one surface of the porous substrate.

Next, a ceramic layer may be formed on one surface of the patterned fabric layer (c). The ceramic layer may be formed through a solution process, e.g., spin coating, slit coating, screen-printing, Inkjet, ODF (one drop filling), or a combination thereof.

The ceramic layer may be formed on the same surface of the patterned fabric layer. The ceramic layer may be formed where the patterned fabric layer is not formed on the one surface of the porous substrate, i.e., in the patterns of the patterned fabric layer. The ceramic layer may substantially have the same thickness as the patterned fabric layer. In an implementation, the ceramic layer may have a thickness that is greater than or less than the thickness of the patterned fabric layer.

Then, a polymer coating layer may be formed on one surface of the ceramic layer (d). The polymer coating layer may be formed through a same solution process as the ceramic layer.

Hereinafter, a secondary or rechargeable lithium battery including the separator according to an embodiment is illustrated referring to FIG. 7.

Figure 7:
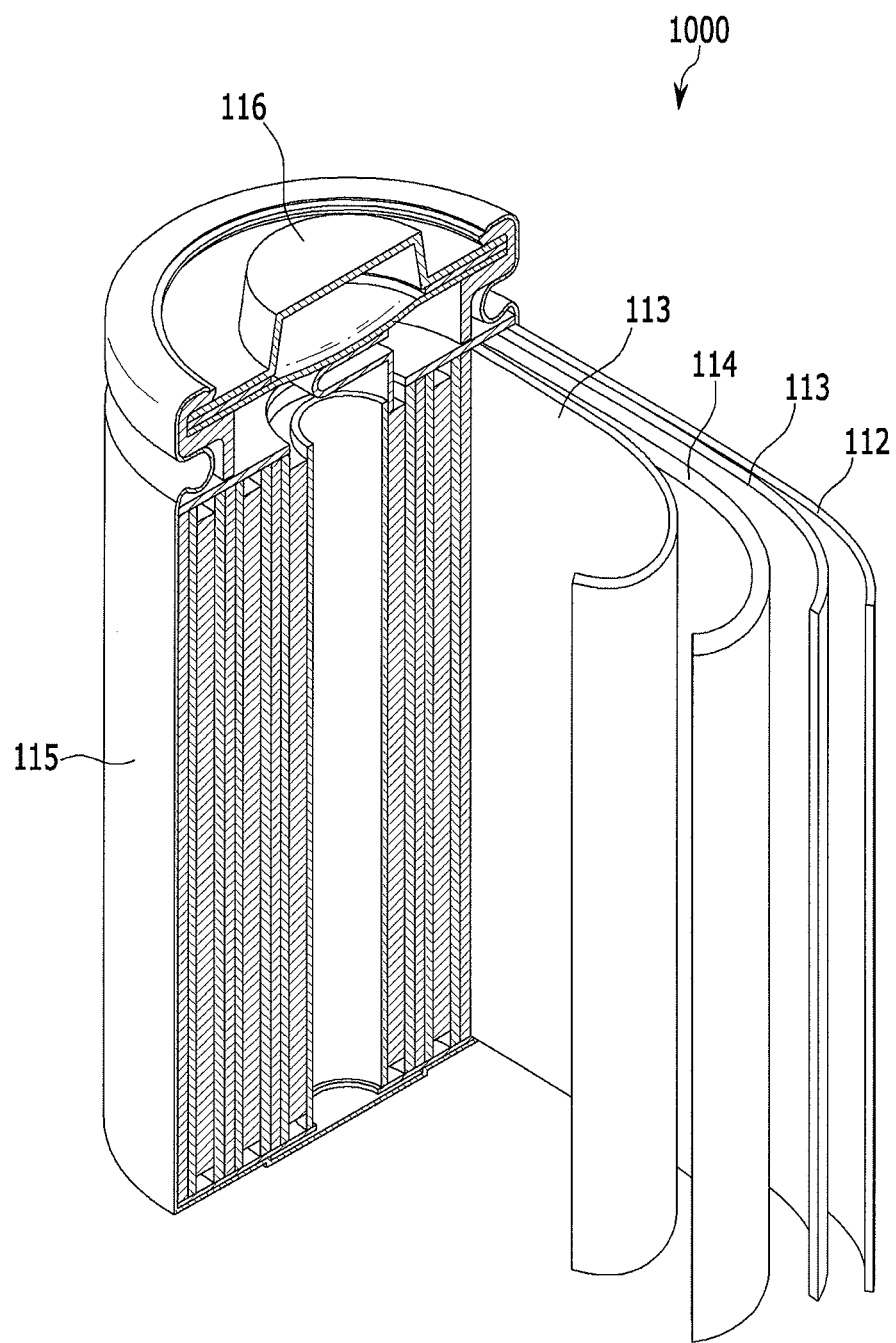
FIG. 7 illustrates a schematic view showing a secondary battery according to an embodiment.

FIG. 7 illustrates a schematic view of a secondary battery according to an embodiment. FIG. 7 shows a cylindrical secondary battery, but the embodiments are not limited thereto.

Referring to FIG. 7, the secondary battery 1000 according to an embodiment may include an electrode assembly including a positive electrode 114, a negative electrode 112 (facing the positive electrode 114), a separator 113 (interposed between the positive electrode 114 and negative electrode 112), an electrolyte solution (not shown) (impregnated in the negative electrode 112, the positive electrode 114, and the separator 113), a battery case 115 (accommodating the electrode assembly), and a sealing member 116 (sealing the battery case 115).

The negative electrode 112 may include a current collector and a negative active material layer on the current collector.

The current collector may be, e.g., a copper foil, a nickel foil, a stainless steel foil, a titanium foil, a nickel foam, a copper foam, a polymer substrate coated with a conductive metal, or a combination thereof. The negative active material layer may include a negative active material, a binder, and optionally a conductive material.

The negative active material may include a material that reversibly intercalates/deintercalates lithium ions, a lithium metal, a lithium metal alloy, a material being capable of doping lithium, or a transition metal oxide.

The material that reversibly intercalates/deintercalates lithium ions may include carbon materials. The carbon material may be a suitable carbon-based negative active material in a lithium ion secondary battery. Examples of the carbon material may include crystalline carbon, amorphous carbon, and a combination thereof. The crystalline carbon may be non-shaped, or sheet, flake, spherical, or fiber shaped natural graphite or artificial graphite. The amorphous carbon may be a soft carbon (carbon obtained by sintering at a low temperature), a hard carbon (carbon obtained by sintering at a high temperature), mesophase pitch carbonized product, fired coke, and the like.

The lithium metal alloy may include lithium and a metal selected from the group of Na, K, Rb, Cs, Fr, Be, Mg, Ca, Sr, Si, Sb, Pb, In, Zn, Ba, Ra, Ge, Al, and Sn.

Examples of the material capable of doping and dedoping lithium may include Si, $SiO_x$ (0<x<2), a Si—Y alloy (wherein Y is an element selected from the group consisting of an alkali metal, an alkaline-earth metal, Group 13 to 16 elements, a transition element, a rare earth element, and a combination thereof, and not Si), Sn, $SnO_2$, Sn—Y (wherein Y is an element selected from the group consisting of an alkali metal, an alkaline-earth metal, Group 13 to 16 elements, a transition element, a rare earth element, and a combination thereof, and is not Sn), and the like. At least one of them may be mixed with $SiO_2$. The element Y may be selected from the group of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may include vanadium oxide, lithium vanadium oxide, or the like.

The binder may help improve binding properties of the negative active material particles to each other and to a current collector, and may include, e.g., polyvinylalcohol, carboxylmethylcellulose, hydroxypropylcellulose, polyvinylchloride, carboxylated polyvinylchloride, polyvinyl fluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material may help improve electrical conductivity of a negative electrode. A suitable electrically conductive material that does not cause a chemical change may be used as a conductive agent. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene; or a mixture thereof.

The negative electrode may be fabricated by a method including mixing an active material, a conductive material, and a binder to prepare an active material composition, and coating the composition on a current collector.

The positive electrode 114 may include a current collector and a positive active material layer disposed on the current collector. The positive active material layer may include a positive active material, a binder, and optionally a conductive material.

The current collector may include, e.g., Al (aluminum).

The positive active material may include compounds (lithiated intercalation compounds) that reversibly intercalate and deintercalate lithium ions. For example, the positive active material may include a composite oxide including cobalt, manganese, nickel or combination thereof, as well as lithium. Specific examples may be one of compounds represented by the following chemical formulae:

$Li_aA_{1-b}B_bD_2$ (wherein, in the above formula, $0.90 \le a \le 1.8$ and $0 \le b \le 0.5$); $Li_aE_{1-b}B_bO_{2-c}D_c$ (wherein, in the above formula, $0.90 \le a \le 1.8$, $0 \le b \le 0.5$, $0 \le c \le 0.05$); $LiE_{2-b}B_bO_{4-c}D_c$ (wherein, in the above formula, $0 \le b \le 0.5$, $0 \le c \le 0.05$); $Li_aNi_{1-b-c}Co_bB_eD_\alpha$ (wherein, in the above formula, $0.90 \le a \le 1.8$, $0 \le b \le 0.5$, $0 \le c \le 0.05$, $0 < \alpha \le 2$); $Li_aNi_{1-b-c}Co_bB_cO_{2-\alpha}F_\alpha$ (wherein, in the above formula, $0.90 \le a \le 1.8$, $0 \le b \le 0.5$, $0 \le c \le 0.05$, $0 < \alpha < 2$); $Li_aNi_{1-b-c}Co_bB_cO_{2-\alpha}F_2$ (wherein, in the above formula, $0.90 \le a \le 1.8$, $0 \le b \le 0.5$, $0 \le c \le 0.05$, $0 < \alpha < 2$); $Li_aNi_{1-b-c}Mn_bB_cD_\alpha$ (wherein, in the above formula, $0.90 \le a \le 1.8$, $0 \le b \le 0.5$, $0 \le c \le 0.05$, $0 < \alpha \le 2$); $Li_aNi_{1-b-c}Mn_b-BcO_{2-\alpha}F_\alpha$ (wherein, in the above formula, $0.90 \le a \le 1.8$, $0 \le b \le 0.5$, $0 \le c \le 0.05$, $0 < \alpha < 2$); $Li_aNi_{1-b-c}Mn_bB_cO_{2-\alpha}F_2$ (wherein, in the above formula, $0.90 \le a \le 1.8$, $0 \le b \le 0.5$, $0 \le c \le 0.05$, $0 < \alpha < 2$); $Li_aNi_bE_cG_dO_2$ (wherein, in the above formula, $0.90 \le a \le 1.8$, $0 \le b \le 0.9$, $0 \le c \le 0.5$, $0.001 \le d \le 0.1$); $Li_aNi_bCo_cMn_dG_eO_2$ (wherein, in the above formula, $0.90 \le a \le 1.8$, $0 \le b \le 0.9$, $0 \le c \le 0.5$, $0 \le d \le 0.5$, $0.001 \le e \le 0.1$); $Li_aNiG_bO_2$ (wherein, in the above formula, $0.90 \le a \le 1.8$, $0.001 \le b \le 0.1$); $Li_aCoG_bO_2$ (wherein, in the above formula, $0.90 \le a \le 1.8$, $0.001 \le b \le 0.1$); $Li_aMnG_bO_2$ (wherein, in the above formula, $0.90 \le a \le 1.8$, $0.001 \le b \le 0.1$); $Li_aMn_2G_bO_4$ (wherein, in the above formula, $0.90 \le a \le 1.8$, $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above chemical formulae, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

The compounds may have a coating layer on a surface, or can be mixed with compounds having a coating layer. The coating layer may include at least one coating element compound selected from the group of an oxide of a coating element, a hydroxide of a coating element, an oxyhydroxide of a coating element, an oxycarbonate of a coating element, and a hydroxyl carbonate of a coating element. The compounds for a coating layer may be amorphous or crystalline. The coating element for a coating layer may include, e.g., Mg, Al, Co, K, Na, Ca, Si, Ti, V, Sn, Ge, Ga, B, As, Zr, or a mixture thereof. The coating layer may be formed in a method having no negative influence on properties of a positive active material by including these elements in the compound. For example, the method may include a suitable coating method such as spray coating, dipping, or the like.

The binder may help improve binding properties of the positive active material particles to each other and to a current collector. Examples of the binder may include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material may help improve electrical conductivity of a negative electrode. A suitable electrically conductive material that does not cause a chemical change may be used as a conductive agent. For example, it may include natural graphite, artificial graphite, carbon black, acetylene black, ketjen black, a carbon fiber, metal powder, metal fiber or the like such as copper, nickel, aluminum, silver or the like, or one or at least one kind mixture of the conductive material such as polyphenylene derivative or the like.

The positive electrode 114 may be manufactured by a method including mixing the active material, a conductive material, and a binder to prepare an active material composition, and coating the composition on a current collector.

The solvent may include, e.g., N-methylpyrrolidone or the like.

The electrolyte solution may include a non-aqueous organic solvent and a lithium salt. The non-aqueous organic solvent may serve as a medium for transmitting ions taking part in the electrochemical reaction of a battery. The non-aqueous organic solvent may include a carbonate-based, ester-based, ether-based, ketone-based, alcohol-based, or aprotic solvent.

The carbonate-based solvent may include, e.g., dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like.

For example, a linear carbonate compound and a cyclic carbonate compound may be mixed, an non-aqueous organic solvent having high dielectric constant and low viscosity may be provided. The cyclic carbonate and the linear carbonate may be mixed together in a volume ratio ranging from about 1:1 to 1:9.

The ester-based solvent may include, e.g., methyl acetate, ethyl acetate, n-propylacetate, dimethylacetate, methylpropinonate, ethylpropinonate, γ-butyrolactone, decanolide, valerolactone, mevalonolactone, caprolactone, or the like. The ether-based solvent may include, e.g., dibutyl ether, tetraglyme, diglyme, dimethoxyethane, 2-methyltetrahydrofuran, tetrahydrofuran, or the like, and the ketone-based solvent may include, e.g., cyclohexanone, or the like. The alcohol-based solvent may include, e.g., ethyl alcohol, isopropyl alcohol, or the like.

The non-aqueous organic solvent may be used singularly or in a mixture. When the organic solvent is used in a mixture, the mixture ratio may be controlled in accordance with a desirable battery performance.

The non-aqueous organic solvent may be further prepared by mixing a carbonate-based solvent with an aromatic hydrocarbon-based solvent. The carbonate-based and the aromatic hydrocarbon-based solvents may be mixed together in a volume ratio ranging from about 1:1 to about 30:1.

The aromatic hydrocarbon-based organic solvent may be represented by the following Chemical Formula 1.

[Chemical Formula 1]

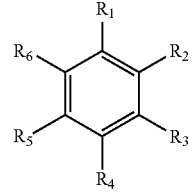

In Chemical Formula 1, $R_1$ to $R_6$ may each independently be hydrogen, a halogen, a $C_1$ to $C_{10}$ alkyl group, a $C_1$ to $C_{10}$ haloalkyl group, or a combination thereof.

The aromatic hydrocarbon-based organic solvent may include, e.g., benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate, an ethylene carbonate-based compound represented by the following Chemical Formula 2, or a combination thereof to improve cycle-life.

[Chemical Formula 2]

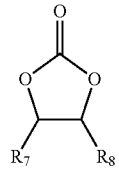

In Chemical Formula 2, $R_7$ and $R_8$ may each independently be hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group.

Examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, or the like. The amount of the vinylene carbonate or the ethylene carbonate-based compound used to improve cycle life may be adjusted within an appropriate range.

The lithium salt may be dissolved in the non-aqueous organic solvent, may supply a battery with lithium ions, may operate a basic operation of the lithium secondary battery, and may help improve lithium ion transportation between positive and negative electrodes therein. Examples of the lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, LiB(C$_2$O$_4$)$_2$ (lithium bis(oxalato)borate, LiBOB), or a combination thereof, as a supporting electrolytic salt. The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

The separator 113 may separate the negative electrode 112 from the positive electrode 114 and may provide a transporting passage of lithium ion, which is the same as described above.

The separator 113 may be adhered to the negative electrode 112 or the positive electrode 114 through the aforementioned polymer coating layer thereof. For example, the separator may include the coating layer including a binder polymer and improved adherence and thus, may be more strongly adhered to an electrode in a pouch-type battery fabricated using a flexible packing material such as a laminating film and the like and prevent a gap generated due to detachment of the electrode therefrom.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparation of Separator

Example 1

A polyethylene substrate was prepared, and an about 40 μm-thick nylon layer was and formed thereon. The nylon layer was patterned to have a reticular structure in which squares were repeated, e.g., to form a patterned fabric layer. The nylon layer was formed in an area of about 15% based on the entire area of the polyethylene substrate.

Next, an Al$_2$O$_3$-containing solution was coated on the nylon layer to be filled in an empty pore the reticular structure and to form a layer, e.g., a ceramic layer, having the same thickness as the nylon layer. The layer formed by the Al$_2$O$_3$-containing solution had porosity of about 40%. Then, an acrylate-containing polymer solution was coated to form about 10 μm-thick layer, e.g., a polymer coating layer, on the nylon layer, fabricating a separator.

Comparative Example 1

A separator was fabricated according to the same method as Example 1 except for forming a flat nylon layer instead of patterning the nylon layer.

Thermal Shrinkage Ratio

The separators according to Example 1 and Comparative Example 1 were respectively heat-treated at 120° C., 150° C., and 180° C. in a convention oven and cooled down to room temperature. The separators were evaluated regarding shrinkage ratio related to the ones before the heat treatment.

As a result, the separator according to Comparative Example 1 had a thermal shrinkage ratio ranging from about 5 to about 10% at 120° C. and a thermal shrinkage ratio of greater than or equal to about 50% at 150° C. However, the separator of Example 1 had no thermal shrinkage at 120° C. and 150° C. and a thermal shrinkage ratio of less than about 2% at 160° C.

The separator fabricated by patterning a fabric layer according to Example 1 had a lower thermal shrinkage ratio than the one according to Comparative Example 1.

By way of summation and review, positive and negative electrodes are repetitively contracted and expanded during charge and discharge cycles. Thus, the electrodes may react with a separator or an electrolyte solution, and the non-aqueous secondary battery may be easily deteriorated and internal and external short circuits may be rapidly increased. When the battery rapidly heats, the separator may be melted and rapidly contracted or destroyed and thus, short-circuited again.

A porous film made of polyolefin may be used as a separator. The polyolefin film may be partly fused and thus, may close pores and cut off a current when a battery is heated up due to overcharge, external or internal short circuit, or the like. Accordingly, the polyolefin film may have excellent shutdown characteristics. Safety of the secondary battery may be improved by improving heat resistance of a material of a separator, an electrode, or the like, e.g., to secure thermal safety even when a separator therein is sharply contracted or destroyed.

The embodiments provide a separator for a secondary battery having improved safety due to excellent heat resistance.

The embodiments provide separator having excellent heat resistance. Thus, a secondary battery having improved thermal safety may be realized.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A separator for a secondary battery, the separator comprising:
   a porous substrate;
   a patterned fabric layer on at least one side of the porous substrate, the at least one side constituting one surface of the porous substrate, the patterned fabric layer having patterns; and
   a polymer coating layer on the patterned fabric layer,
   wherein the patterned fabric layer covers about 5% to about 15% of the at least one side of the porous substrate.

2. The separator as claimed in claim 1, wherein the patterned fabric layer is a woven, non-woven, or knitted fabric.

3. The separator as claimed in claim 1, wherein the patterns of the patterned fabric layer have a reticular structure or an island structure.

4. The separator as claimed in claim 1, wherein the patterned fabric layer includes at least one of a polymer, glass, or cellulose fiber.

5. The separator as claimed in claim 1, wherein the patterned fabric layer has a thickness of about 10 μm to about 10,000 μm.

6. The separator as claimed in claim 1, wherein the polymer coating layer includes at least one of an acrylate polymer, a urethane polymer, a melamine polymer, an epoxy polymer, an unsaturated ester polymer, a resorcinol polymer, a polyamide, a vinyl polymer, and a styrene polymer.

7. The separator as claimed in claim 6, wherein the polymer coating layer further includes a binder.

8. The separator as claimed in claim 1, wherein the polymer coating layer includes an adhesive.

9. The separator as claimed in claim 1, further comprising a ceramic layer on the patterned fabric layer.

10. The separator as claimed in claim 9, wherein the ceramic layer is porous.

11. The separator as claimed in claim 9, wherein the ceramic layer includes at least one metal compound selected from the group of a metal oxide, a metal nitride, and a metal phosphide.

12. The separator as claimed in claim 9, wherein:
the ceramic layer is in the patterns of the patterned fabric layer, and
the polymer coating layer is on the ceramic layer.

13. The separator as claimed in claim 12, wherein the ceramic layer and the patterned fabric layer each have a thickness, the thickness of the ceramic layer being the same as the thickness of the patterned fabric layer.

14. The separator as claimed in claim 12, wherein the ceramic layer and the patterned fabric layer each have a thickness, the thickness of the ceramic layer being greater than the thickness of the patterned fabric layer.

15. The separator as claimed in claim 12, wherein the ceramic layer and the patterned fabric layer each have a thickness, the thickness of the ceramic layer being less than the thickness of the patterned fabric layer.

16. The separator as claimed in claim 1, wherein the porous substrate includes a polyolefin, the polyolefin including at least one of polyethylene, polypropylene, polyvinylidene fluoride, or a copolymer thereof.

17. The separator as claimed in claim 1, wherein the polymer coating layer is on an outermost surface of the patterned fabric layer such that the patterned fabric layer is between the polymer coating layer and the porous substrate.

18. The separator as claimed in claim 1, wherein the polymer coating layer is on an outermost surface of the patterned fabric layer and in the patterns of the patterned fabric layer.

19. A secondary battery, comprising an electrode assembly, the electrode assembly including a first electrode, a second electrode, and the separator as claimed in claim 1, wherein the separator is between the first electrode and the second electrode.

* * * * *